(12) United States Patent
Peabody (10) Patent No.: US 7,732,708 B1
(45) Date of Patent: Jun. 8, 2010

(54) LONGITUDINAL LOAD LIMITING DEVICES FOR TRANSMISSION LINES AND THE LIKE

(76) Inventor: Alan B. Peabody, 12601 Turks turn, Anchorage, AK (US) 99516

( * ) Notice: Subject to any disclaimer, the term of this patent is extended or adjusted under 35 U.S.C. 154(b) by 1163 days.

(21) Appl. No.: 11/303,667

(22) Filed: Dec. 16, 2005

Related U.S. Application Data (60) Provisional application No. 60/637,577, filed on Dec. 19, 2004.

(51) Int. Cl.
*H02G 7/20* (2006.01)

(52) U.S. Cl. ............ 174/40 R; 174/42; 174/45 R; 174/45 TD; 174/40 TD; 248/61; 248/63; 361/107

(58) Field of Classification Search ........... 174/40 R, 174/45 R, 45 TD, 40 TD, 150, 42; 361/107, 361/1, 62, 67, 79; 248/61, 63, 64, 548; 118/372
See application file for complete search history.

(56) References Cited

U.S. PATENT DOCUMENTS

| | | | | | |
|---|---|---|---|---|---|
| 3,005,866 | A | * | 10/1961 | Fraser et al. ............ | 174/45 R |
| 3,150,229 | A | * | 9/1964 | Milow ................... | 174/45 R |
| 3,211,260 | A | * | 10/1965 | Jackson ................. | 188/372 |
| 3,519,727 | A | * | 7/1970 | Johns et al. ............ | 174/45 R |
| 3,711,049 | A | * | 1/1973 | Grannis ................. | 174/40 R |
| 4,791,243 | A | * | 12/1988 | Ibanez et al. ........... | 174/45 R |
| 5,898,558 | A | * | 4/1999 | Ostendorp ............. | 174/45 TD |

* cited by examiner

*Primary Examiner*—Angel R Estrada
(74) *Attorney, Agent, or Firm*—Michael J. Tavella (57) ABSTRACT

A device for limiting loads on towers that limits loads only in the longitudinal direction and does not affect the manner in which vertical and transverse loads are resisted by the structure. The device incorporates a shield to prevent ice buildup that could affect its operation. It also has optional antifriction bearings to provide a consistent release force independent of the amount of ice that may accumulate on the wires. The device is of simple construction. The device includes an optional energy absorber, such as that used in U.S. Pat. No. 3,211,260 that can provide a resisting force that is within the longitudinal strength of the tower. The device includes both a mechanical fuse and an energy absorbing mechanism that is used to arrest the wire movement. The energy absorber can extend as much as 50 ft to safely absorb the energy released by broken wires with heavy ice coatings.

21 Claims, 14 Drawing Sheets

LONGITUDINAL LOAD LIMITING DEVICES FOR TRANSMISSION LINES AND THE LIKE

CROSS REFERENCE TO RELATED APPLICATIONS

This application claims the benefit under 35 U.S.C. 119(e) based on Provisional Application No. 60/637,577, filed Dec. 19, 2004.

STATEMENT REGARDING FEDERALLY SPONSORED RESEARCH AND DEVELOPMENT

Not Applicable

BACKGROUND OF THE INVENTION

1. Field of the Invention

This invention relates to a device that limits the longitudinal loads on an electrical transmission structure and particularly to a device to limit the longitudinal loads on an electrical transmission structure, which includes an energy dissipating mechanism that safely dissipates the energy released when a failure releases the tension in the wires.

2. Description of the Prior Art

Figure 1:
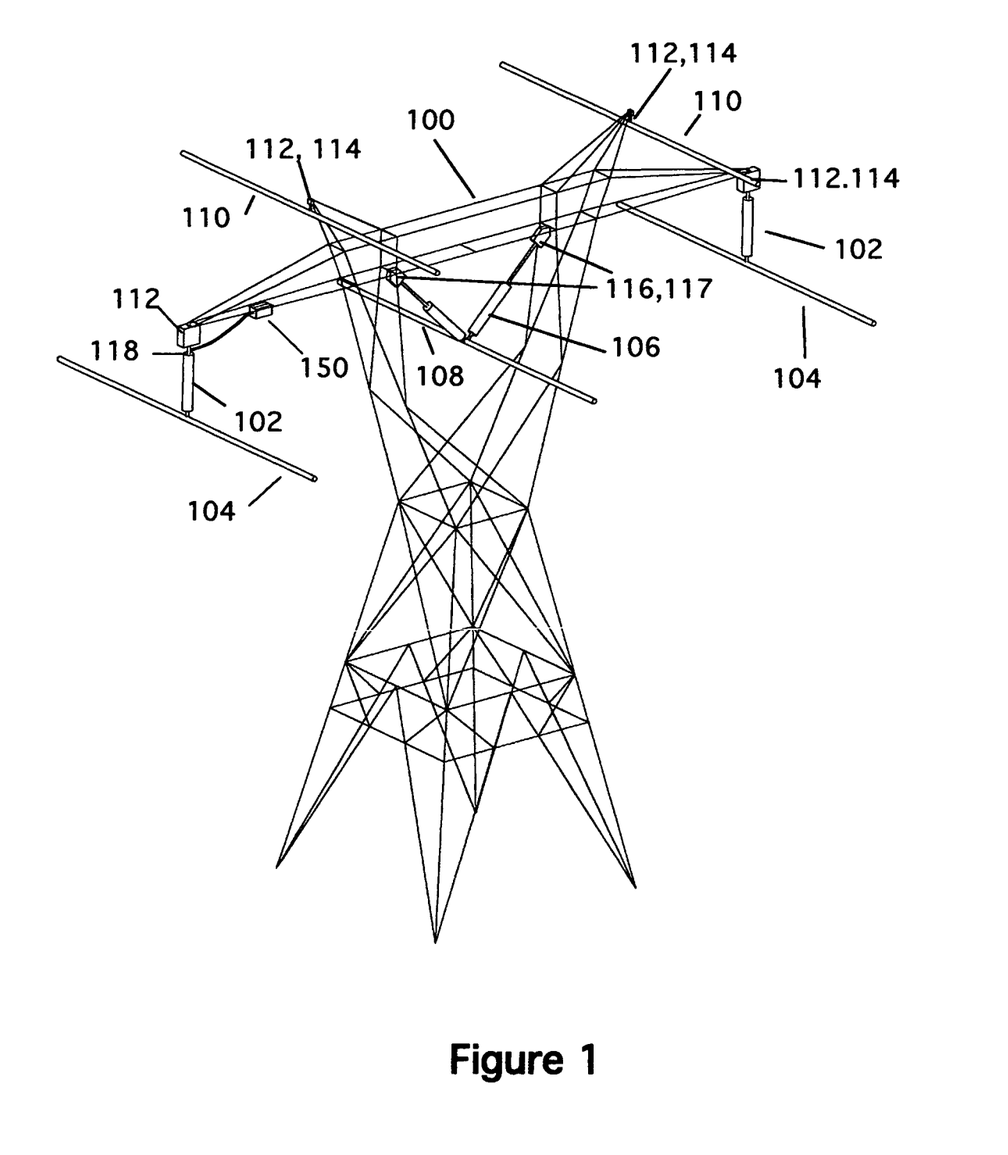
FIG. 1 is a perspective view of a transmission tower showing the invention in place.

On electrical transmission lines, longitudinal loads act parallel to the wires that carry electricity. Transverse loads act horizontally perpendicular to the wires and vertical loads act downward or upward. On the majority of transmission towers, the wires are suspended from the structure as shown in FIG. 1. Under normal loading, a transmission structure with suspended wires is loaded principally in the vertical and transverse directions. The longitudinal loads are typically very small when the wires are suspended. As long as these loads do not exceed the design limits of a tower or other structure, the tower is safe. Circumstances can arise, however, in which these load limits can be exceeded.

An example of this occurs when the wires on one side of the tower are heavily loaded with ice and the wires on the opposite side are bare. Another example of this is when one of the conductors or shield wires breaks. These events cause large unbalanced longitudinal loads on the tower that can cause tower failure. One longitudinal tower failure can transfer load to the adjacent tower causing it to also fail leading to a cascading failure of many towers in a particular line.

To prevent collapse of the line, devices are used to limit the force on the tower due to unbalanced ice loads and loads that occur when a line break or similar failure occurs. Two approaches to limiting the damage are represented in the prior art. The first is to install a mechanical fuse, which releases the wire from the tower at a predetermined force. The second is to install an energy-absorbing element that remains connected to the tower.

Examples of mechanical fuses are found in the following U.S. patents: U.S. Pat. No. 3,150,229 teaches a link type device that is designed to release under the proper longitudinal force. This causes the line to drop away from the tower, thereby protecting the tower from excessive forces. U.S. Pat. No. 3,519,727 teaches a device for releasing a "V" string insulator line during a failure. This is designed to reduce the pulling load on the tower in such a line failure and includes anti-friction pads. U.S. Pat. No. 3,711,049 teaches a load limiter device that is designed to drop a line from a tower under excessive force. By dropping the line, the tower can be saved.

The problem with these mechanical fuses is that they all have limitations on their use. They are complicated devices with many parts. Freezing rain and fog can cause buildups of ice that prevent their proper operation. Anti-friction devices are needed for consistent operation when the weight of the wires changes due to ice buildup.

Examples of energy absorbing devices incorporated in the insulator assemblies of the tower are found in the following U.S. Pat. No. 4,791,243 teaches an energy absorption device that has a non-spring helix that is placed between a tower and the insulator string. The device deforms by plastically uncoiling in response to excessive forces. U.S. Pat. No. 5,898,558 teaches a protective overload device that uses a cable embedded in a frangible matrix to absorb energy during a failure. After the device has operated, the cable and frangible matrix can be replaced without having to replace the entire unit.

The problem with these units is that they operate on the combined vertical, transverse and longitudinal loads. A balanced heavy ice load can trigger unintended operation of the unit that removes the protection against broken wires.

U.S. Pat. No. 3,005,866 teaches a connector that attaches the line to the insulator. The connector has a pair of coils attached between two parts, one of which is connected to the insulator and the other to the conductor. When a line breaks, the connector rotates in relation to the insulator, allowing the two parts to separate. The coils then extend, thereby reducing the shock on the tower and possible preventing the line from dropping to the ground. The problem with this device is that the insulator is typically made up of flexible units that are not stiff enough to ensure the rotation of the connector in relation to the insulator to allow activation of the coils.

Finally, U.S. Pat. No. 3,211,260 teaches an arrester that has a large body of material held in a housing. When excessive force is applied, the material is pulled out of the housing, over a series of pins. This action absorbs the energy as the material is pulled from the housing.

BRIEF DESCRIPTION OF THE INVENTION

The instant invention is a device for limiting loads on towers that limits loads only in the longitudinal direction and does not affect the manner in which vertical and transverse loads are resisted by the structure. The device incorporates a shield to prevent ice buildup that could affect its operation. It also has optional antifriction bearings to provide a consistent release force independent of the amount of ice that may accumulate on the wires. The device is of simple construction. The device includes an optional energy absorber, such as that used in U.S. Pat. No. 3,211,260 that can provide a resisting force that is within the longitudinal strength of the tower.

The instant invention includes both a mechanical fuse and an energy absorbing mechanism that is used to arrest the wire movement.

The energy absorber can extend as much as 50 ft to safely absorb the energy released by broken wires with heavy ice coatings.

BRIEF DESCRIPTION OF THE DRAWINGS

FIG. 3c FIG. 3a is a perspective detail view of the fuse body showing the shroud in place.

FIG. 5a is a cross-section view taken along the lines 5a-5a of FIG. 4a.

FIG. 8b is a top detail view of the energy dissipater taken along the lines 8b-8b of FIG. 8a.

FIG. 9 is an enlarged side detail of the energy dissipater of FIG. 8a.

DETAILED DESCRIPTION OF THE INVENTION

FIG. 1 shows a typical transmission structure 100 with I-string insulator assemblies 102 supporting the outside phase conductors 104 and a V-string insulator assembly 106 supporting the center phase conductor 108. The structure includes shield wires. The instant invention, which includes a fuse body 112 and either a fuse link 114 or an energy dissipater 116, is installed between the insulator assemblies 102 and 106 and the structure 100 as shown. The shield wires are connected directly to the tower using the fuse body 112 and either the fuse link 114 or an energy dissipater 116. An energy dissipater can also be connected between an alternate form of fuse link 118 and the structure 100, as discussed below.

Figure 2:
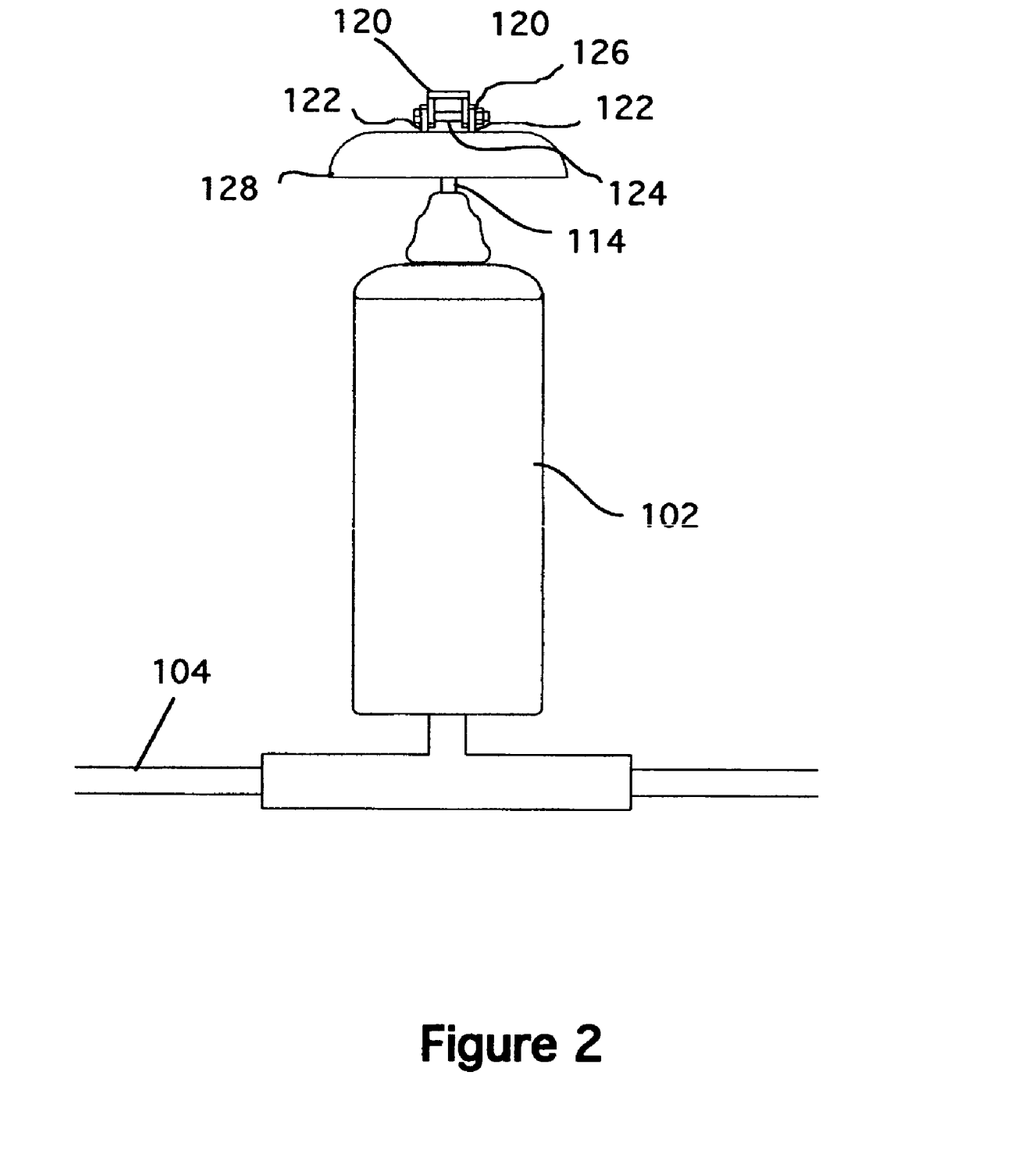
FIG. 2 is an elevation view of a typical "I" string type insulator with the invention in place.

FIG. 2 is an elevation of the I-string insulator assembly 102 looking perpendicular to the wires 104. The fuse body 112 is attached to the tower using at least two vangs 120 on the tower with corresponding vangs 122 on the fuse body. The fuse body 112 is attached to the tower using a bolt or pin as an axle 124 and a nut or retainer 126. The fuse body is able to swing back and forth about axle 124 in the plane of the tower perpendicular to the conductors 104.

Figure 3:
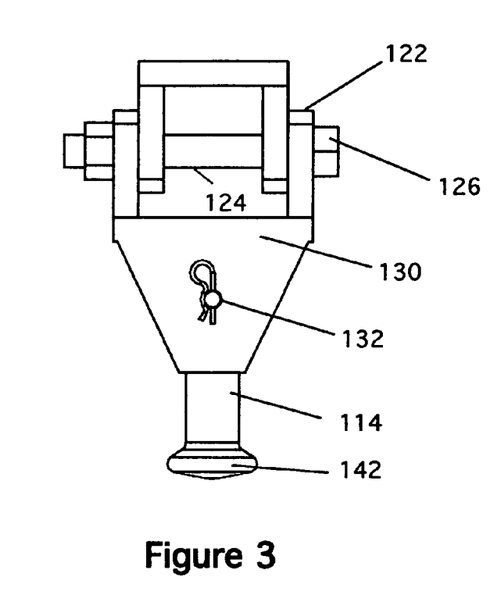
FIG. 3 is a front elevation detail view of the fuse body showing the shroud removed.
Figure 3A:
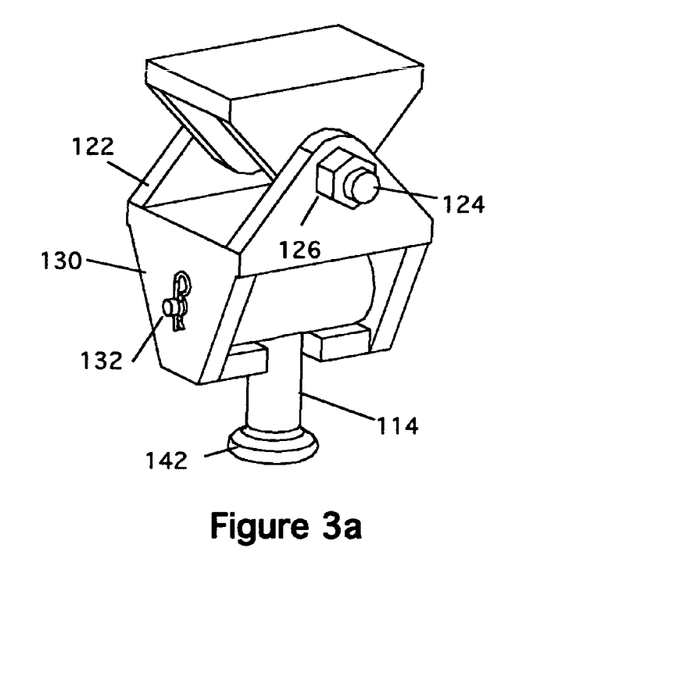
FIG. 3a is a perspective detail view of the fuse body showing the shroud removed.

FIG. 3 shows a detail of the fuse body showing the shroud 128 removed revealing the fuse frame 130, the shear pin 132, and the fuse link 114. FIG. 3a is a perspective detail view of the fuse body showing the shroud removed. In this view, the device is shown rotated to view the interior. Here, the fuse frame 130, the shear pin 132, and the fuse link 114 are shown as well as the axle 124.

Figure 3B:
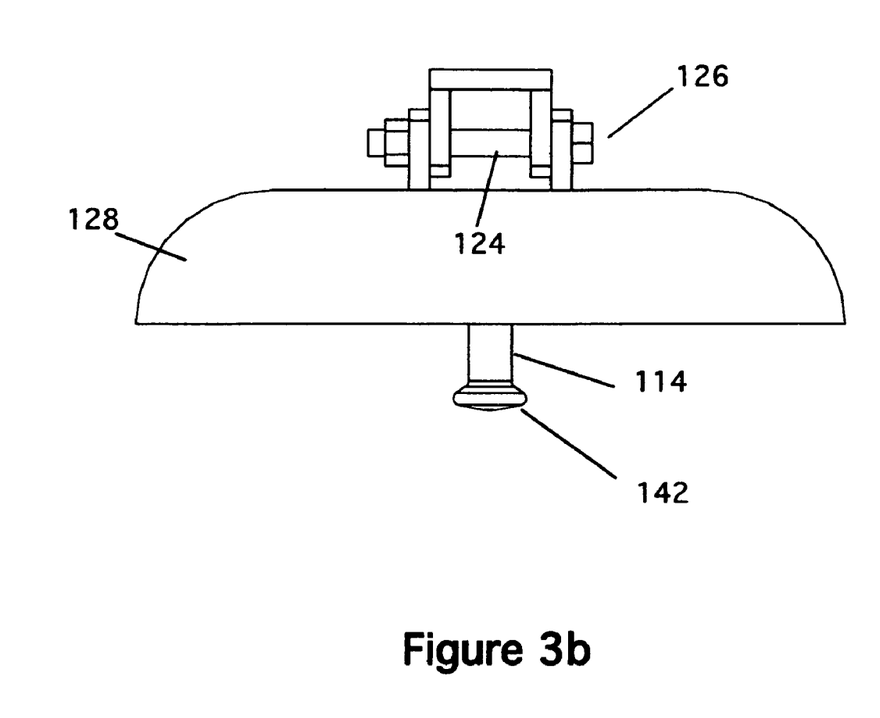
FIG. 3b is a front elevation detail view of the fuse body showing the shroud in place.

FIG. 3b is a front elevation detail view of the fuse body showing the shroud 128 in place.

Figure 3C:
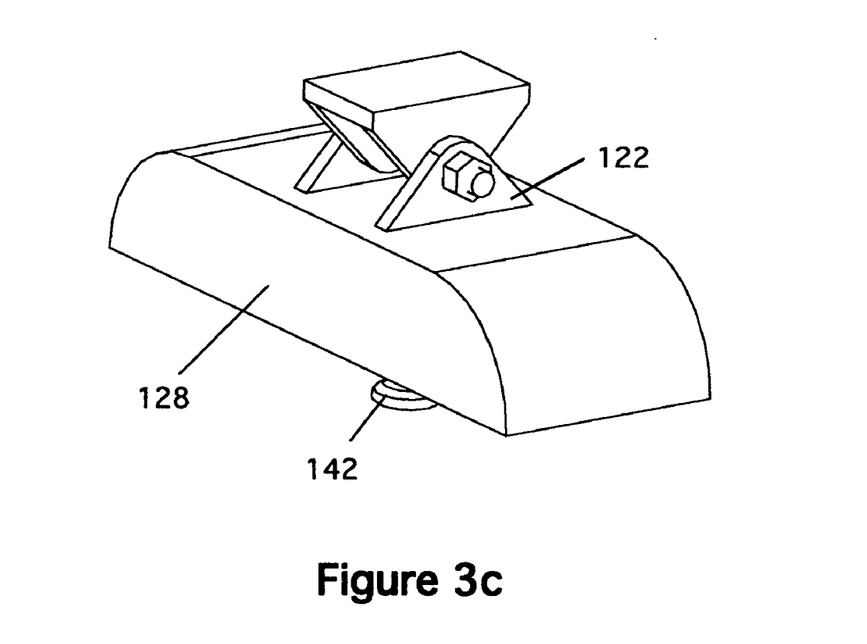

FIG. 3c is a perspective detail view of the fuse body showing the shroud 128 in place from another angle.

Figure 4A:
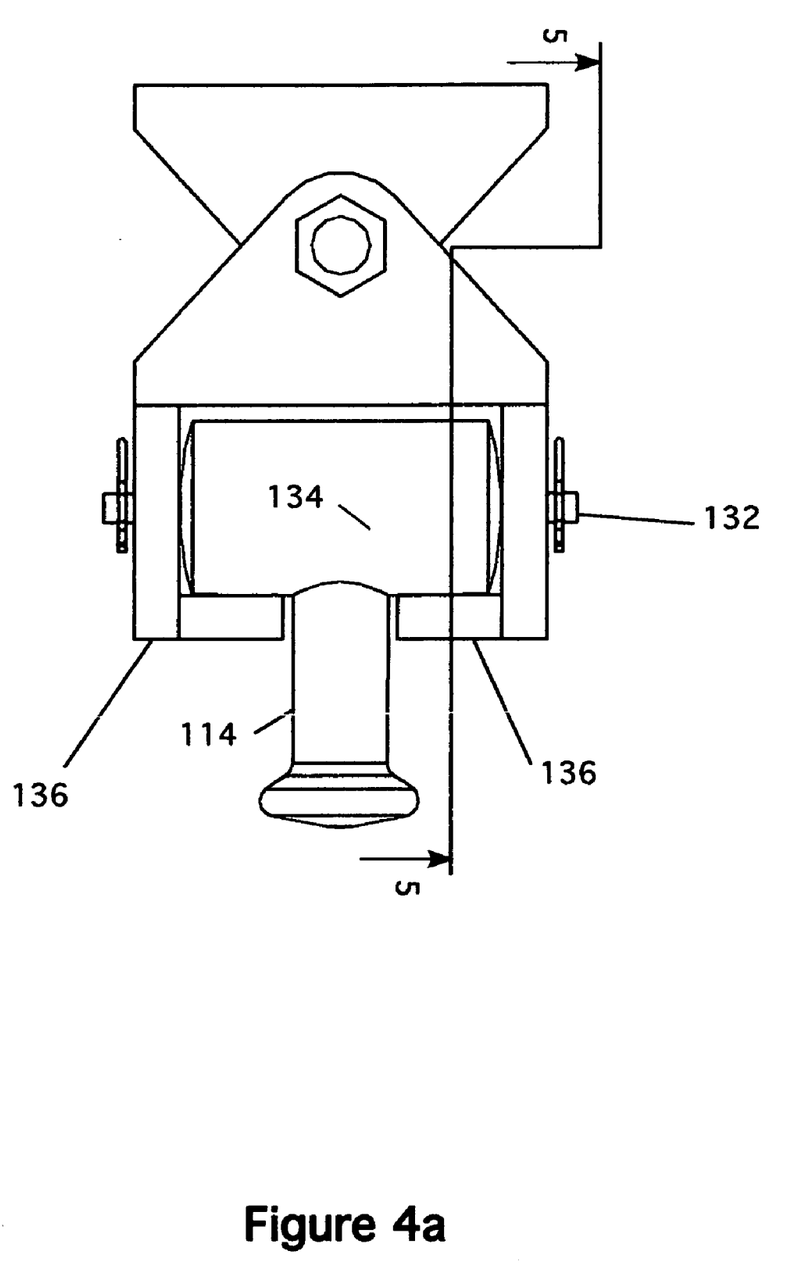
FIG. 4a is a detail view of the fuse link and the fuse frame looking parallel to the path of electrical conductors.
Figure 4B:
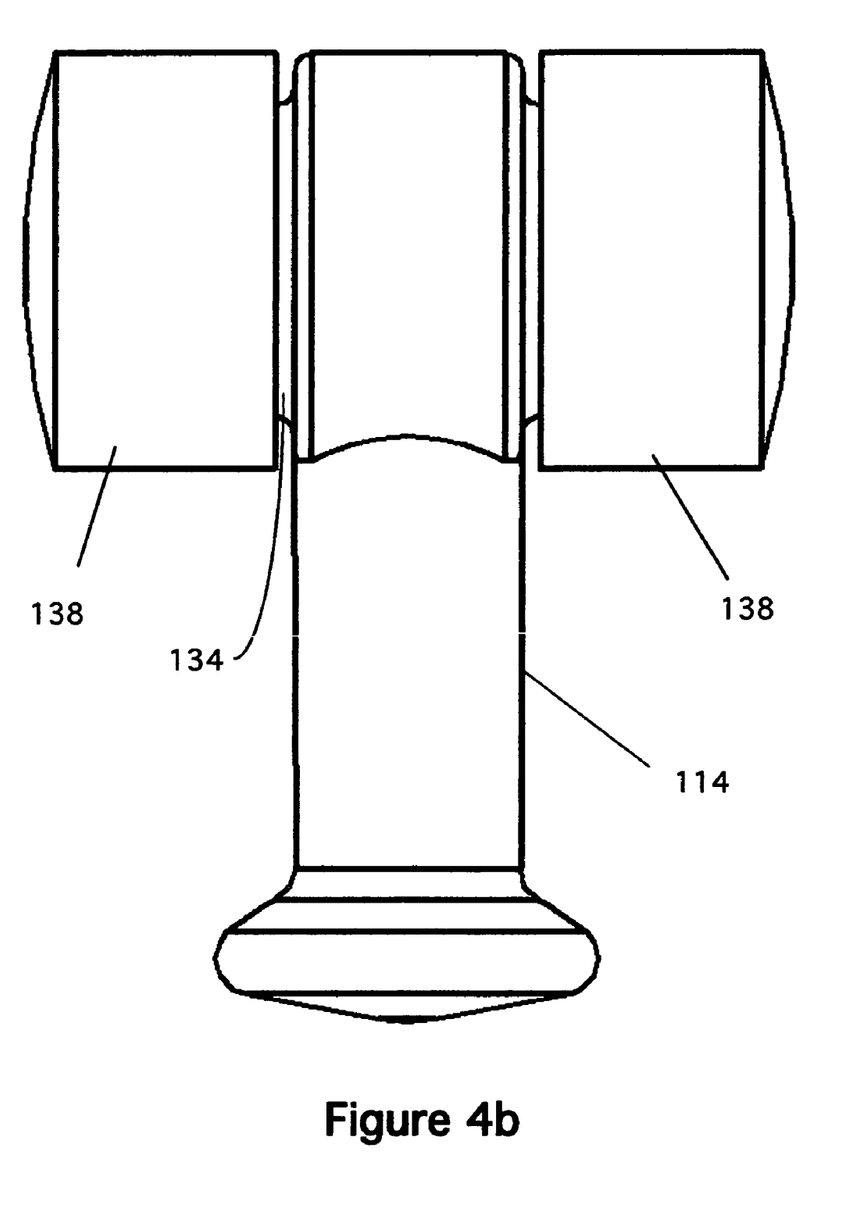
FIG. 4b is an enlarged view showing wheels that may be installed on the fuse link axle.
Figure 4C:
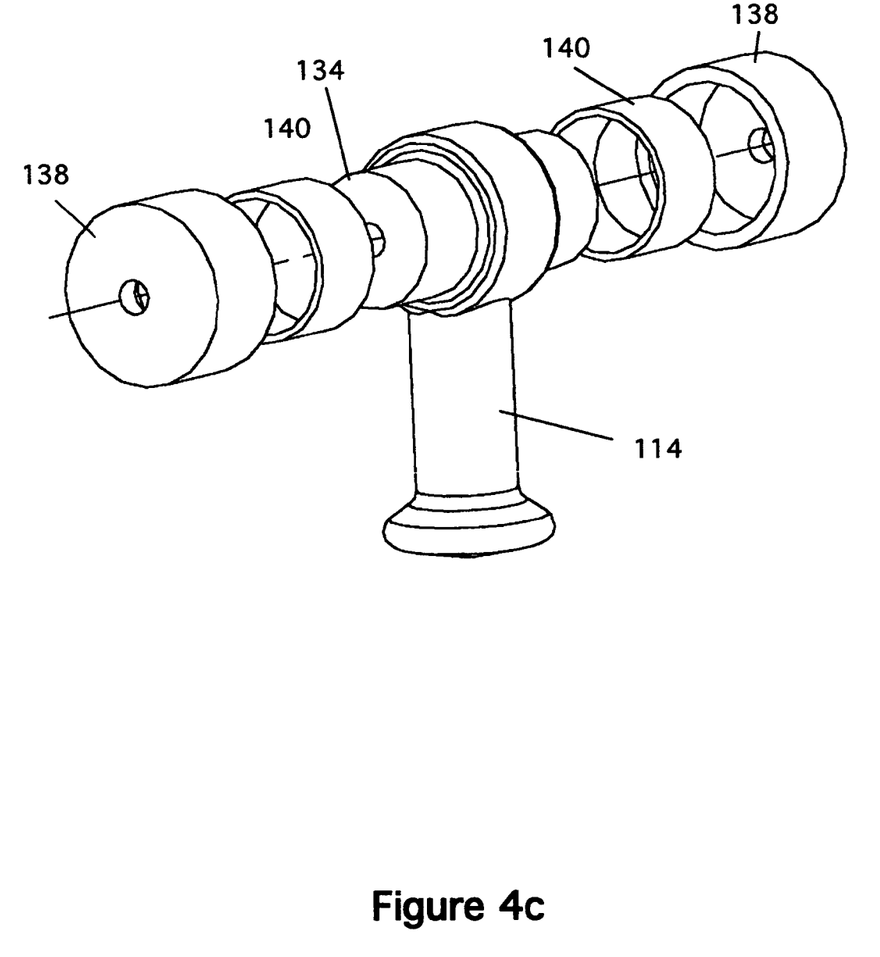
FIG. 4c is an exploded view of the fuse link assembly of FIG. 4b.
Figure 5A:
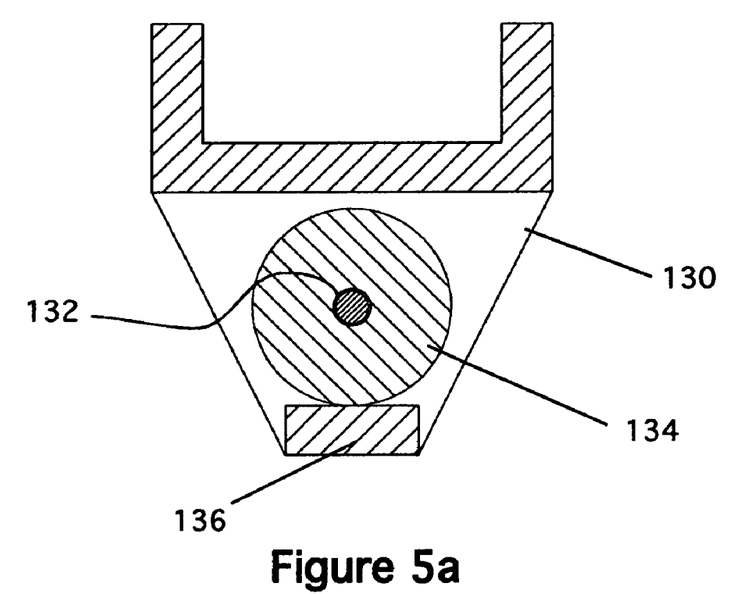
Figure 5B:
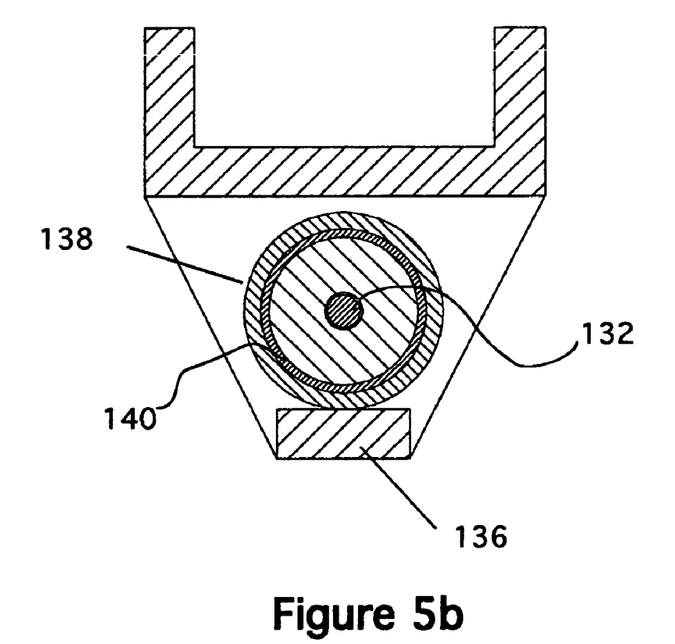
FIG. 5b is a cross-section view taken along the lines 5a-5a of FIG. 4a showing the unit with the fuse link of FIG. 4b in place.

FIG. 4a shows a view of the fuse link 114 and the fuse frame 130 looking parallel the wires. The fuse link has an axle 134, the nose 136 of which may be square or rounded to avoid jamming in the fuse frame 130. The fuse link axle 134 bears on the fuse frame ledge 136. Alternatively, as shown in FIGS. 4b and 4c, wheels 138 may be installed on the fuse link axle 134. FIG. 4c is an exploded view of this assembly FIG. 5a shows section 5a-5a from FIG. 4a. Fuse link axle 134 bears directly on fuse frame ledge 136. The link 134 is held from moving longitudinally by shear pin 132. Alternatively as shown in FIG. 5b, which is section 5b-5b from FIG. 4b, the fuse link axle 134 is held in place by shear pin 132. A bearing 140 is used between the fuse link axle 134 and the wheel 138. See also FIG. 4c.

A connector 142 (see, e.g., FIG. 4a) is formed in the fuse link arm. A ball connector is shown that can be used directly with typical ball and socket insulators; however, a tongue, clevis or other connector may also be used.

In operation, when the wires are loaded only vertically and transversely, the fuse body 112 and fuse link 114 rotate as a unit about axle 124, staying inline with insulators 102 or the particular arm of the V-string insulator 106. The fuse link axle 134, or if wheels 138 are installed, bears on ledge 136 normal to its face evenly balanced on both ends of the axle or both wheels. If the insulator assembly 102 or 106 is pulled longitudinally by the phase conductors 104, 108, or shield wires 110, the fuse link rotates about the centerline of its axle 134. It is retained in place longitudinally by shear pins 132 until the strength of the shear pins 132 is exceeded. When the shear pin 132 shears, the fuse link 114 slides or rolls off ledge 136 detaching the wires 104, 108 or 110 from the tower. The strength of the shear pin 132 and friction with the ledge 136 determine the maximum longitudinal load that can be applied to the structure 100 by the wires 104, 108, or 110. If wheels 138 and bearings 140 are used, friction with the ledge 136 will not affect the release load, as the wheels will roll off the end.

Figure 6:
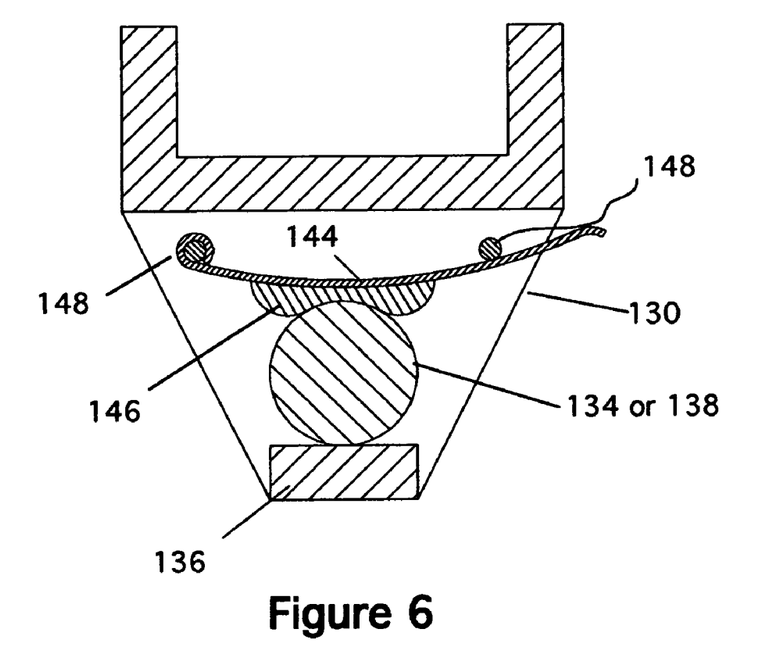
FIG. 6 is a cross-section of the fuse link of FIG. 4a with the shear pin removed and a spring installed.

In FIG. 6, rather than use a shear pins 132, a spring 144 mounted to the fuse frame 130 with mounts 148 and a formed retainer 146, can be used to hold the fuse link axle 134 or wheels 138 in place longitudinally. The load at which the fuse link 114 can be detached from the fuse frame 130 will depend on the spring stiffness, preload, and the shape of the formed retainer 146.

Figure 7:
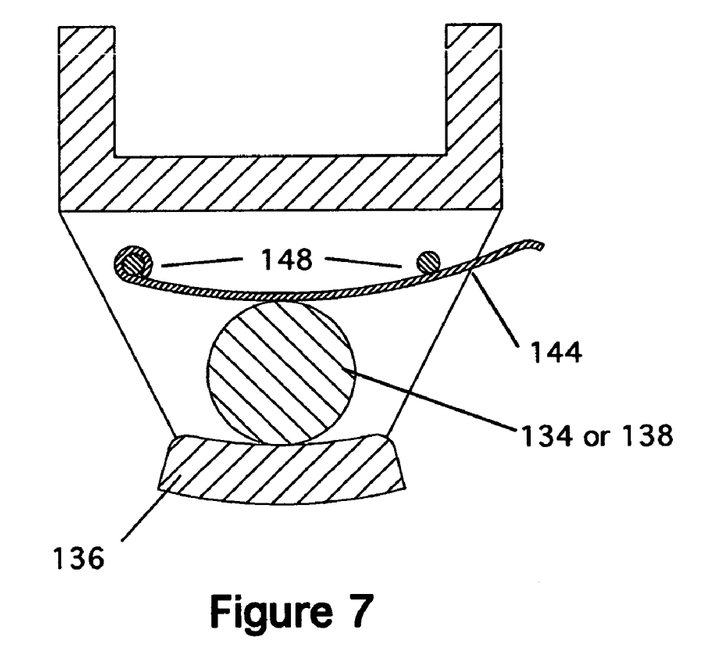
FIG. 7 is a cross-section similar to FIG. 6, except that a curved ledge is installed.

FIG. 7 shows a curved ledge 136 that provides some self-centering capability to the fuse link arm. The curved ledge can be used with a spring 144 without needing a formed retainer 146, or it can be used with a shear pin 132 instead of a spring.

Figure 8A:
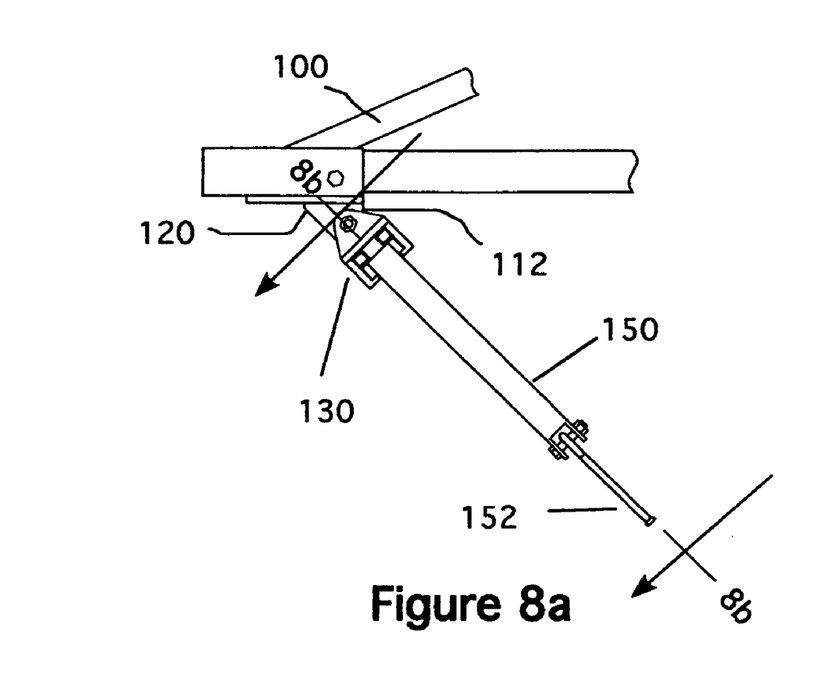
FIG. 8a is a side detail view showing an energy dissipater with an extension link installed on a tower.

FIG. 8a shows the fuse link 114 replaced with an energy dissipater 150 with an extension link 152 having a connector 142 to connect it with the insulator assembly 102, 106 or the shield wire 110.

Figure 8B:
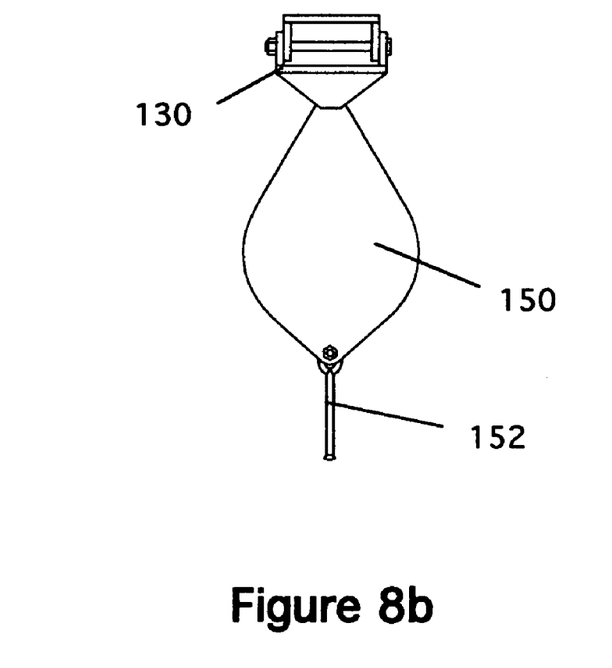

FIG. 8b is a top view taken along the lines 8b-8b of FIG. 8a. This shows the shape of the energy dissipater 150.

Figure 9:
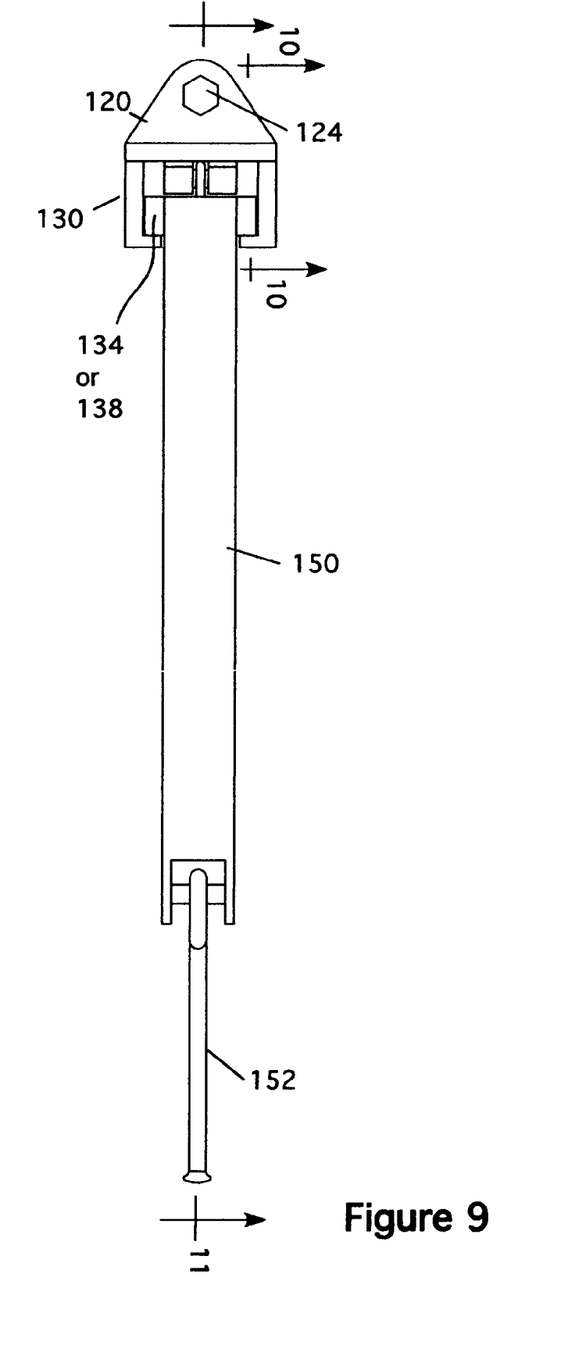

FIG. 9 shows the energy dissipater 150 marked with sectional views.

Figure 10:
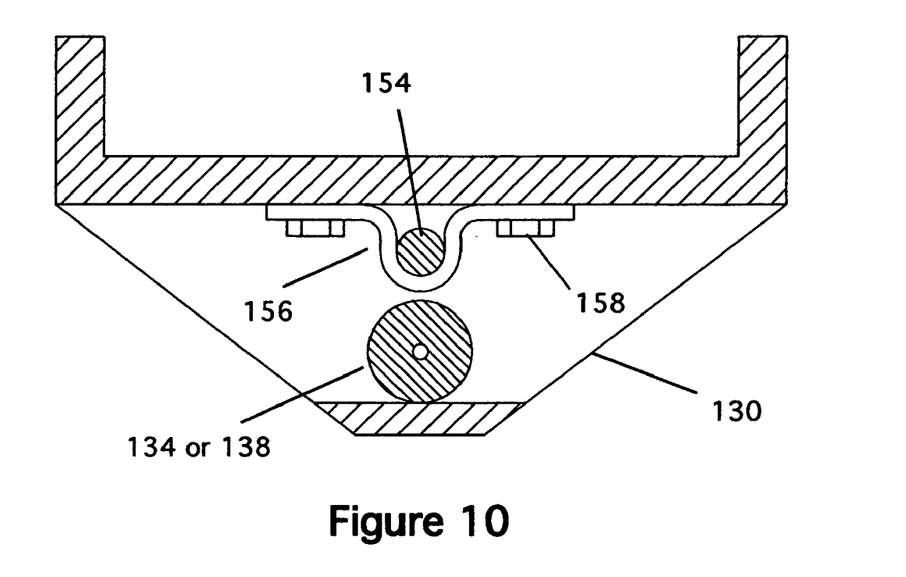
FIG. 10 is a detail cross-section of a portion of the energy dissipater taken along lines 10-10 of FIG. 9.
Figure 11:
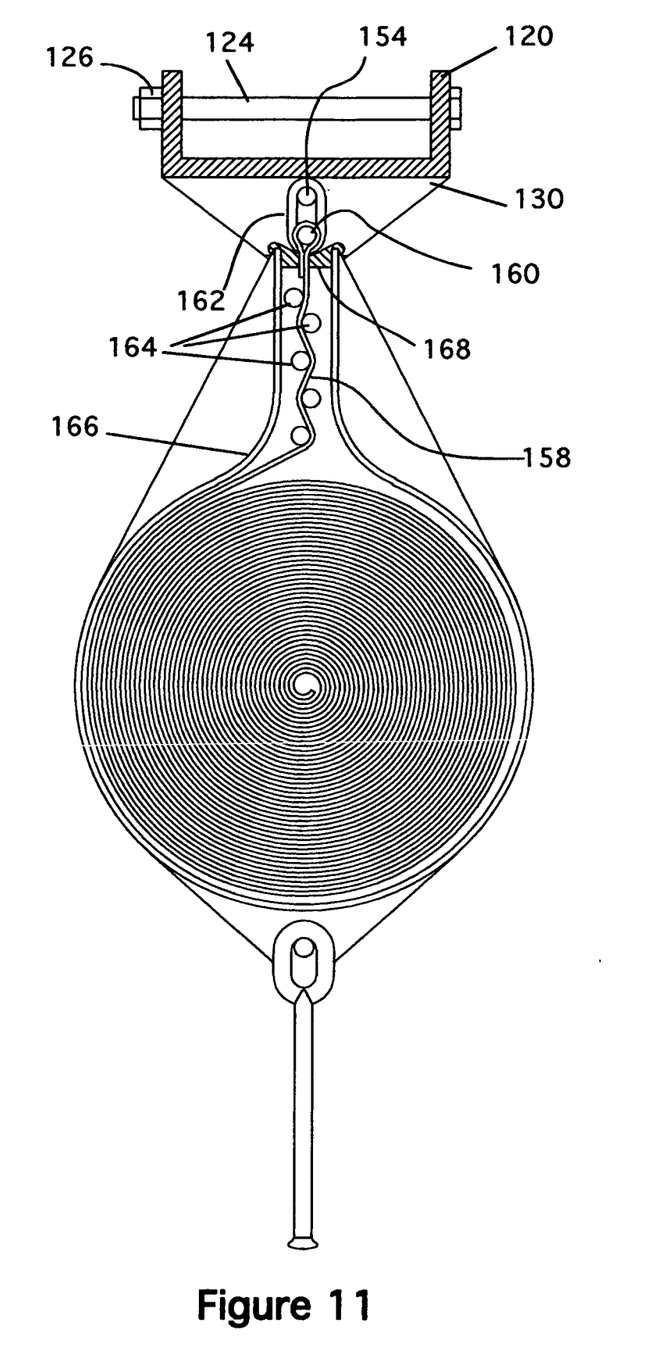
FIG. 11 is a detail cross-section of a portion of the energy dissipater taken along lines 11-11 of FIG. 9.
Figure 12:
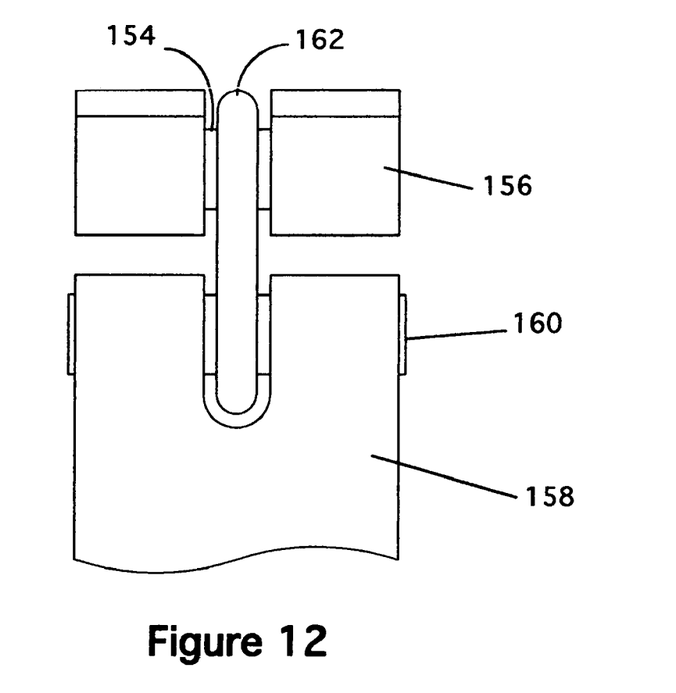
FIG. 12 is a detail view of one method of connecting a tape to an anchor pin.

In FIG. 10, is a section view 10-10 of FIG. 9. Here, the energy dissipater 150 can take many different forms. The example illustrated here is prior art in the form of a Van-Zelm metal bender (U.S. Pat. Nos. 2,979,163; 2,980,213 & 3,211, 260). However, this is a new use for the Van-Zelm metal bender. As shown, axles 134 with or without wheels 138 and bearings 140 are incorporated into the energy dissipater 150. The energy dissipater is installed into the fuse frame 130 and retained in the same way described above for the fuse link 114. An anchor pin 154, anchor pin retainer 156 fastened with anchor pin retainer bolts 158, are added to the fuse frame 130 as shown. FIG. 11 is a section taken along the lines 11-11 of FIG. 9. Here, the interior of the energy dissipater 150 is shown. A connector 162 is used to connect the tape 158 to the anchor pin 154. One method of connection is shown in FIG. 12, where the tape 158 is bent around a tape pin 160 to provide a place for connector 162. Tape pin 160 has the same axis as axle 134 or wheels 138. Thus, rotation of the energy absorber about that axis thus does not bend the tape. In operation, when a longitudinal force exceeds the release load of the fuse (either the strength of the shear pins 132 or the release force of springs 144), the energy absorber swings free of ledge 136 and begins to pull the tape 158 out of the casing of the energy absorber 166 past the tape pins 164. The bending and unbending of the tape dissipates energy and resists the longitudinal movement of the wires (104, 108 or 110), safely bringing the wires to rest. The tape exit is protected from water intrusion by a molded plug 168, which pulls out of the casing 166 with the tape 158.

Figure 13:
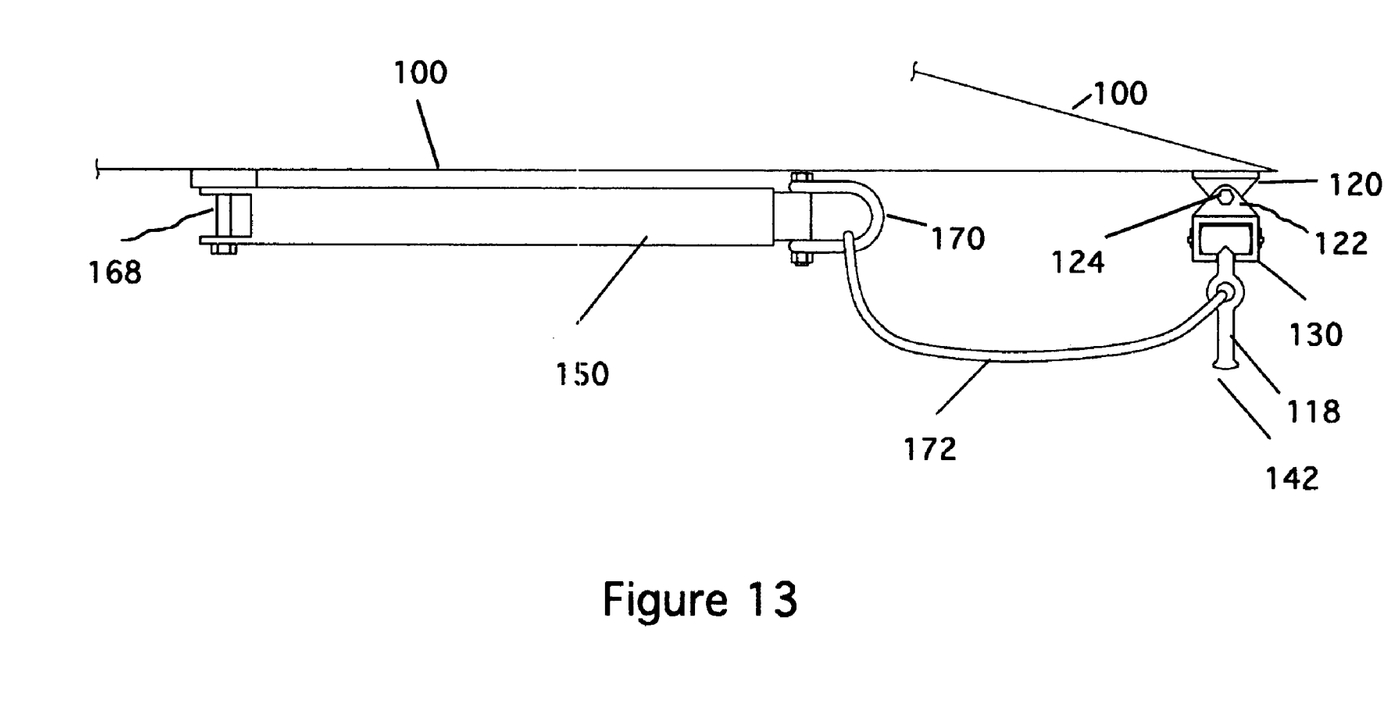
FIG. 13 is a detail view of an alternative arrangement where a fuse body and its frame are installed normally, but the fuse link is replaced with an alternative fuse link.

FIG. 13 shows an alternative arrangement where the fuse body 112 and its frame 130 is installed normally, but the fuse link 114 is replaced with an alternative fuse link 118, which has provision for attaching a flexible connector 172 that is attached to the energy dissipater 150 with a shackle 170. The energy dissipater 150 is connected to the tower horizontally with a pin 168 suitably attached to the tower. When the alternate fuse link 118 is pulled out of the fuse frame 130 under a longitudinal load, the tape in the energy dissipater 150 is pulled out, dissipating energy and safely bringing the wires to a stop.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A longitudinal load limiting devices for transmission lines comprising:
   a) a fuse housing, having a pair of bottom ledges;
   b) a fuse link, having an axle, extending outwardly therefrom, said fuse link being operably installed in said fuse housing such that said axle that bears on said pair of bottom ledges on the fuse frame; and
   c) a shear pin, positioned in said fuse and fuse housing to hold the fuse link in place in a longitudinal direction with respect to a transmission line wire, such that, under longitudinal displacement of the transmission line wire, the fuse link swings about its axle in line with the transmission line wire, applying a force to the shear pins, and further, when said shear pin is severed the transmission line wire is released from the structure.

2. The device of claim 1 wherein the transmission line wire is selected from the group of phase conductors or shield wires.

3. The device of claim 1 further comprising a means for attaching said device to a transmission tower.

4. The device of claim 1 further comprising a means for attaching said axle to an insulator.

5. The device of claim 1 wherein the fuse further comprises: a pair of wheels, rotatably attached to said axle.

6. The device of claim 5 further comprising a pair of bearings, in operable communication with said pair of wheels and said axle.

7. The device of claim 1 further comprising a shroud, placed on said fuse holder to cover said fuse.

8. The device of claim 1 wherein the pair of bottom ledges are curved.

9. The device of claim 1 further comprising an energy-dissipating device.

10. The device of claim 9 wherein the energy-dissipating device comprises:
    a) a housing,
    b) a coil of deformable tape, having an end, installed in said housing;
    c) a means for deforming said tape, installed in said housing;
    d) a means for attaching the end of said tape to said fuse; and
    e) a means for attaching said housing to a tower.

11. The device of claim 9 wherein the energy-dissipating device comprises:
    a) a housing,
    b) a coil of deformable tape, having an end, installed in said housing;
    c) a means for deforming said tape, installed in said housing;
    d) a means for attaching the end of said tape to said fuse; and
    e) a means for attaching said housing to a V-string insulator assembly.

12. The device of claim 10 wherein the means for attaching the end of said tape to said fuse includes a length of flexible line.

13. A longitudinal load limiting devices for transmission lines comprising:
    a) a fuse housing, having a pair of bottom ledges;
    b) a fuse link, having an axle, extending outwardly therefrom, said fuse link being operably installed in said fuse housing such that said axle that bears on said pair of bottom ledges on the fuse frame; and
    c) a leaf spring, positioned in said fuse housing to hold the fuse link in place in a longitudinal direction with respect to a transmission line wire, such that, under longitudinal displacement of the transmission line wire, the fuse link swings about its axle in line with the transmission line wire, compressing said leaf spring, and further when said leaf spring is compressed sufficiently, the transmission line wire is released from the structure.

14. The device of claim 13 further comprising a means for providing a retaining force on said fuse link, operably positioned on said fuse housing.

15. The device of claim 14 wherein the means for providing a retaining force comprises a retainer, positioned between said leaf spring and said fuse axle.

16. The device of claim 14 wherein the means for providing a retaining force comprises a pair of curved bottom ledges.

17. The device of claim 13 further comprising a shroud, placed on said fuse holder to cover said fuse.

18. The device of claim 13 further comprising an energy-dissipating device.

19. The device of claim 18 wherein the energy-dissipating device comprises:
    a) a housing,
    b) a coil of deformable tape, having an end, installed in said housing;
    c) a means for deforming said tape, installed in said housing;
    d) a means for attaching the end of said tape to said fuse; and
    e) a means for attaching said housing to a tower.

20. The device of claim 18 wherein the means for attaching the end of said tape to said fuse includes a length of flexible line.

21. The device of claim 18 wherein the energy-dissipating device comprises:
   a) a housing,
   b) a coil of deformable tape, having an end, installed in said housing;
   c) a means for deforming said tape, installed in said housing;
   d) a means for attaching the end of said tape to said fuse; and
   e) a means for attaching said housing to a V-string insulator assembly.

* * * * *